(12) United States Patent
Martin et al.

(10) Patent No.: US 6,220,845 B1
(45) Date of Patent: *Apr. 24, 2001

(54) MOLD CLAMPING AND PRECURE OF A POLYMERIZABLE HYDROGEL

(75) Inventors: Wallace Anthony Martin, Orange Park; Jonathan Patrick Adams, Jacksonville, both of FL (US); Kaj Bjerre, Vallensbaek Strand (DK); Svend Christensen, Allinge (DK); Ture Kindt-Larsen, Holte (DK); Craig William Walker, Jacksonville, FL (US); Daniel Tsu-Fang Wang, Jacksonville, FL (US); Michael Francis Widman, Jacksonville, FL (US); Stephen Craig Pegram, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/318,916

(22) Filed: May 26, 1999

Related U.S. Application Data

(62) Division of application No. 08/825,281, filed on Mar. 27, 1997, now Pat. No. 5,981,618, which is a division of application No. 08/636,507, filed on Apr. 26, 1996, now abandoned, which is a continuation-in-part of application No. 08/257,792, filed on Jun. 10, 1994, now abandoned.

(51) Int. Cl.$^7$ ..................................................... B29D 11/00
(52) U.S. Cl. ................... 425/174.4; 264/1.32; 264/1.38; 425/451.9; 425/453; 425/808
(58) Field of Search ............................. 425/174.4, 451.9, 425/453, 808; 264/1.32, 1.38

(56) References Cited

U.S. PATENT DOCUMENTS

| | | |
|---|---|---|
| 4,257,988 | 3/1981 | Matos et al. . |
| 4,260,564 | 4/1981 | Baiocchi et al. . |
| 4,415,509 | 11/1983 | Toyooka et al. . |
| 4,609,337 | 9/1986 | Wichterle et al. . |
| 4,786,444 * | 11/1988 | Hwang ................................. 264/1.4 |
| 4,919,850 * | 4/1990 | Blum et al. .......................... 264/1.4 |
| 4,944,584 | 7/1990 | Maeda et al. . |
| 4,944,899 | 7/1990 | Morland et al. . |
| 5,084,224 | 1/1992 | Watters . |
| 5,271,875 | 12/1993 | Appleton et al. . |
| 5,290,488 | 3/1994 | Arai et al. . |
| 5,366,668 | 11/1994 | Cuthbertson et al. . |
| 5,519,069 | 5/1996 | Burke et al. . |
| 5,524,419 | 6/1996 | Shannon . |
| 5,656,208 | 8/1997 | Martin et al. . |
| 5,981,618 * | 11/1999 | Martin et al. ....................... 523/106 |

\* cited by examiner

*Primary Examiner*—James P. Mackey

(57) ABSTRACT

An apparatus and method for partially curing a polymerizable monomer or monomer mixture to form a soft contact lens includes a transport device for transporting a plurality of contact lens molds to a precure station in a low oxygen environment, each contact lens mold including a first and second mold half with a polymerizable monomer or monomer mixture therebetween. A clamping member having a plurality of mold engagement members clamps a first contact lens mold half against a second contact lens mold half for a predetermined pressure and time. While the mold halves of the contact lens mold are clamped, the polymerizable monomer or monomer mixture is exposed to a radiant energy source for polymerizing the polymerizable monomer or monomer mixture contained in each contact lens mold.

12 Claims, 10 Drawing Sheets

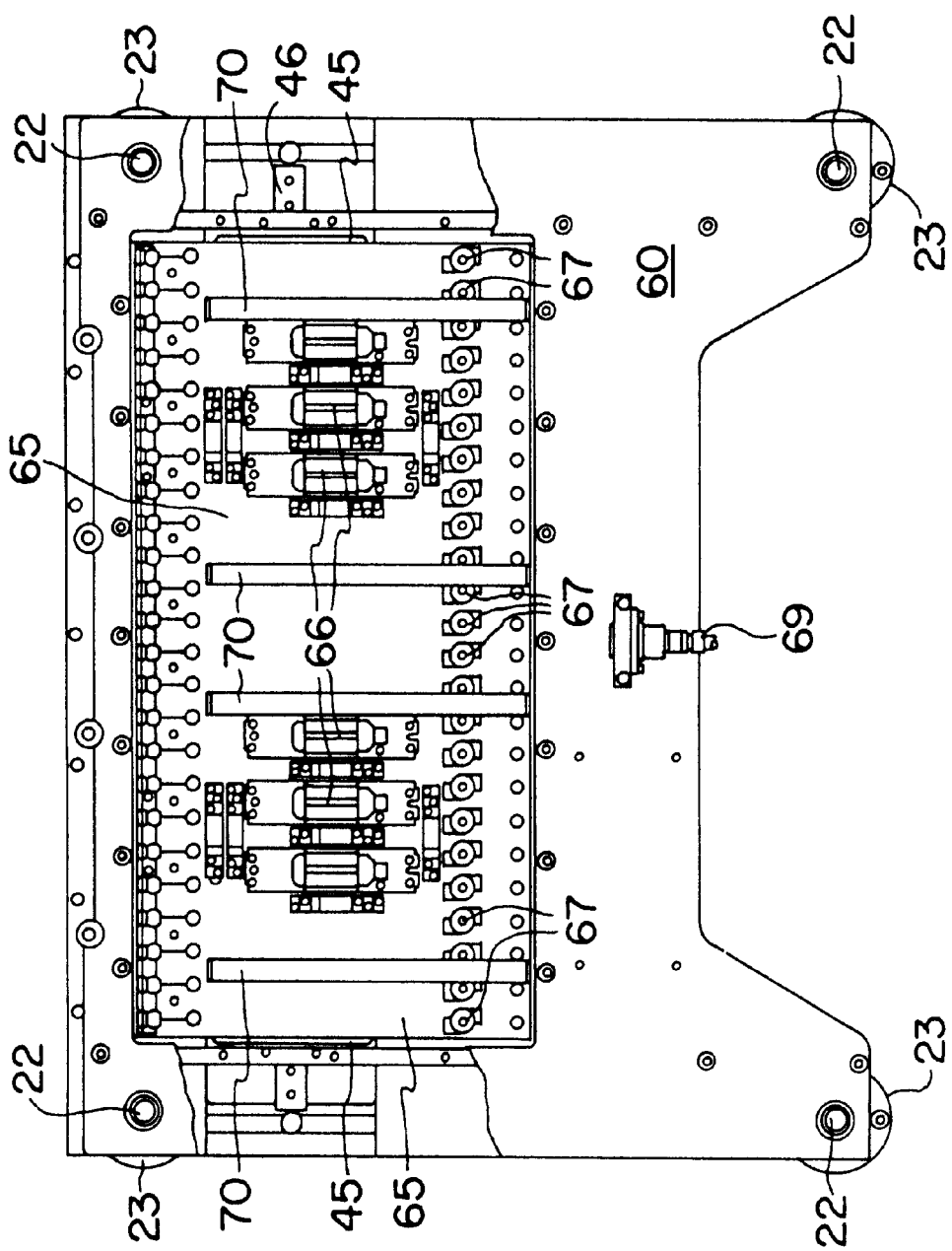

MOLD CLAMPING AND PRECURE OF A POLYMERIZABLE HYDROGEL

CROSS REFERENCE TO RELATED APPLICATIONS

This application is a division of application Ser. No. 08/825,281, filed Mar. 27, 1997, now U.S. Pat. No. 5,981,618, which is a division of application Ser. No. 08/636,507, filed Apr. 26, 1996, now abandoned, which is a continuation-in-part of application Ser. No. 08/257,792, filed Jun. 10, 1994, now abandoned.

BACKGROUND OF THE INVENTION

1. Field of the Invention

The present invention relates generally to an apparatus and method for molding soft contact lenses, and particularly an apparatus and method for precuring a polymerizable monomer or monomer mixture under pressure to form a soft contact lens.

2. Discussion of the Prior Art

U.S. Pat. No. 4,495,313 to Larsen, now assigned to the assignee of the present application, discloses the polymerization of a monomer to form a soft contact lens by means of ultraviolet light. In addition, this reference also teaches that an ultraviolet light catalyst can be added to the polymerization system to effect an essentially complete polymerization.

U.S. Pat. No. 5,039,459 to Kindt-Larsen et al. entitled "Method of Forming Shaped Hydrogel Articles Including Contact Lenses" teaches the polymerization of soft contact lenses wherein the monomer/diluent mixture in a transparent polystyrene mold is exposed on one side to 1.7 jewels/centimeter squared of ultraviolet radiation for ten minutes at 55° C. (TL 09 lamps with peak radiation of 350 nm).

In addition to these two references, U.S. Pat. Nos. 4,565,348; 4,680,336; 4,640,489 and 5.080,839 all disclose the polymerization of a monomer with ultraviolet light to form a soft contact lens. The entire disclosure of each of these references are hereby incorporated by reference into this patent application.

SUMMARY OF THE INVENTION

The present invention is an apparatus and a method for precuring a polymerizable monomer mixture to form a soft contact lens in a mold with avoids decentration of the resultant lens, enables a more uniform cure for the lens during the cure step, and which reduces "puddling" or cavitation of the lens in the mold during cure.

In accordance with the present invention, a polymerizable monomer or monomer mixture is deposited in a lens mold having first concave and second convex mold halves. The mold halves are formed of polysytrene or other material transparent to actinic or visible radiation. The mold halves are transported from the deposition and mold assembly station to the precure station of the present invention, and clamped together under predetermined pressure for a predetermined period of time which may be done in a low oxygen environment. The second or convex mold half may be slightly thinner than the first or concave mold half to enable mold compliance during cure as the monomer is polymerized. The clamping pressure aligns flanges formed on the first and second mold halves to ensure that the flanges are parallel and that the respective curves of the molds are aligned. The clamping pressure also seats the second convex mold half against an annular edge formed on the first mold half to essentially sever any excess monomer from the monomer contained within the mold.

After a predetermined clamping period, the hydrogel is exposed to actinic or visible radiation, such as an UV light source, to partially cure the hydrogel to a gel state. After a second predetermined period of exposure under clamping pressure, the clamping action and the UV radiation may be removed, and the partially precured hydrogel lens is transported in the mold to a curing station for complete polymerization and cure. Alternatively, a complete cure may be effected in the apparatus.

It is an object of the present invention to provide a novel means for precuring a polymerizable monomer or monomer mixture to form a soft contact lens. The means includes a transport for intermittently transporting a plurality of contact lens molds to the precure station in a low oxygen environment. The contact lens molds include first and second mold halves with a polymerizable monomer or monomer mixture therebetween. The means also include a plurality of means for clamping the first mold half to the second mold half for a predetermined period of time in a low oxygen environment. The polymerizable monomer or monomer mixture is then exposed to actinic radiation for a predetermined period of time while it is under pressure to partially or completely cure the monomer or monomer mixture.

The clamping pressure may be applied by an annular air cylinder, spring driven annular cylinder, or physical weights which allows actinic radiation to pass through the annulus of the cylinder and through one or more of the mold halves and into the monomer or monomer mixture. The means may include a means for controlling the duration and intensity of the clamping pressure, and the duration and intensity of the actinic radiation. It has been found that under certain conditions involving a pre-cure or partial cure of the monomer, that the surface energy attraction between the clamping means and the mold half may result in premature separation of one or more sets of mold halves from the carrier pallet when the clamping means is retracted at the end of the pre-cure step.

The exact cause of this phenomena is unknown, but the mold halves and monomer are very light in weight, and the attraction may involve surface energy, static electricity, or migration of minute amounts of oils from the mold halves to the clamping means over time. When the precure apparatus cycles, the attracted set of mold halves is stacked on another set in a different pallet, eventually leading to rupture of the mold halves and contamination of the production equipment with partially cured monomer. While the incidence of such premature separation is low, the cost of shutting down a line operating in a controlled atmosphere for cleaning is very high, and thus to be avoided.

It is therefore an object of the present invention to minimize the surface energy attraction between the mold halves and the clamping means, and the opportunity for premature separation of the mold halves from the carrier pallet.

It is another object of the present invention to provide a clamping means which will provide radially uniform pressure to clamp the mold halves together.

Another object of the present invention is to provide a novel method of precuring a polymerizable monomer or monomer mixture to form a soft contact lens. The method includes a step of depositing a polymerizable monomer or monomer mixture in a contact lens mold having first concave and second concave mold halves with the monomer therebetween. The mold halves are then clamped together with a predetermined pressure and then exposed to radiation to partially polymerize the monomer to a precured gel-like state. The clamping pressure is then relieved and the lens is then cured with additional radiation or a combination of heat and radiation.

In the preferred embodiment the radiation source may be actinic, electron beam or radioactive source, but preferably is an ultraviolet lamp which irradiates the monomer at 2–4 mW/cm$^2$ for 5–60 seconds, but preferably 20–40 seconds. Radiation may also be from a high intensity UV source that is pulsed or cycled.

The clamping step aligns the mold halves, causes excess monomer to be removed from the mold cavity, and seats a compliant second mold half against a first mold half for the precure step.

It is an object of the present invention to precure a polymerizable monomer or monomer mixture to a gel-like state wherein polymerization has been initiated throughout the monomer, and utilize the shrinkage of the monomer and the compliance of the mold halves to seal and hold the mold halves together for the remainder of the cure period. This substantially avoids decentration defects which can occur if the back curve mold half is tipped or rotated with respect to the front curve mold half prior to cure.

It is another object of the present invention to precure the hydrogel in a low oxygen environment to prevent undesired absorption of oxygen by the monomer.

It is another object of the present invention to provide an adjustable means for varying the clamping pressure during the precure step.

It is another object of the present invention to minimize the surface energy attraction between the clamping means and the mold halves while simultaneously providing a radially uniform clamping pressure during the clamping step.

It is another object of the present invention to provide a reciprocating means for positioning the actinic light source at an exposure position, and then retracting the light source to a second position for transport of the lens molds.

It is further an object of the present invention to provide an alternate reciprocating means for positioning the lens molds against the light source for exposure, and retracting the molds to a second position for transport.

BRIEF DESCRIPTION OF THE DRAWINGS

The foregoing objects and advantages of the present invention for precuring a polymerizable monomer or monomer mixture may be more readily understood by one skilled in the art with reference to the following detailed description of the two preferred embodiments, taken in conjunction with the accompanying figures wherein like elements are designated by identical reference numerals throughout the several views.

FIG. 6 is a plan view of a reciprocating portion of the apparatus for precuring a polymerizable monomer or monomer mixture to form a contact lens.

DETAILED DESCRIPTION OF THE PREFERRED EMBODIMENT

Figure 1:
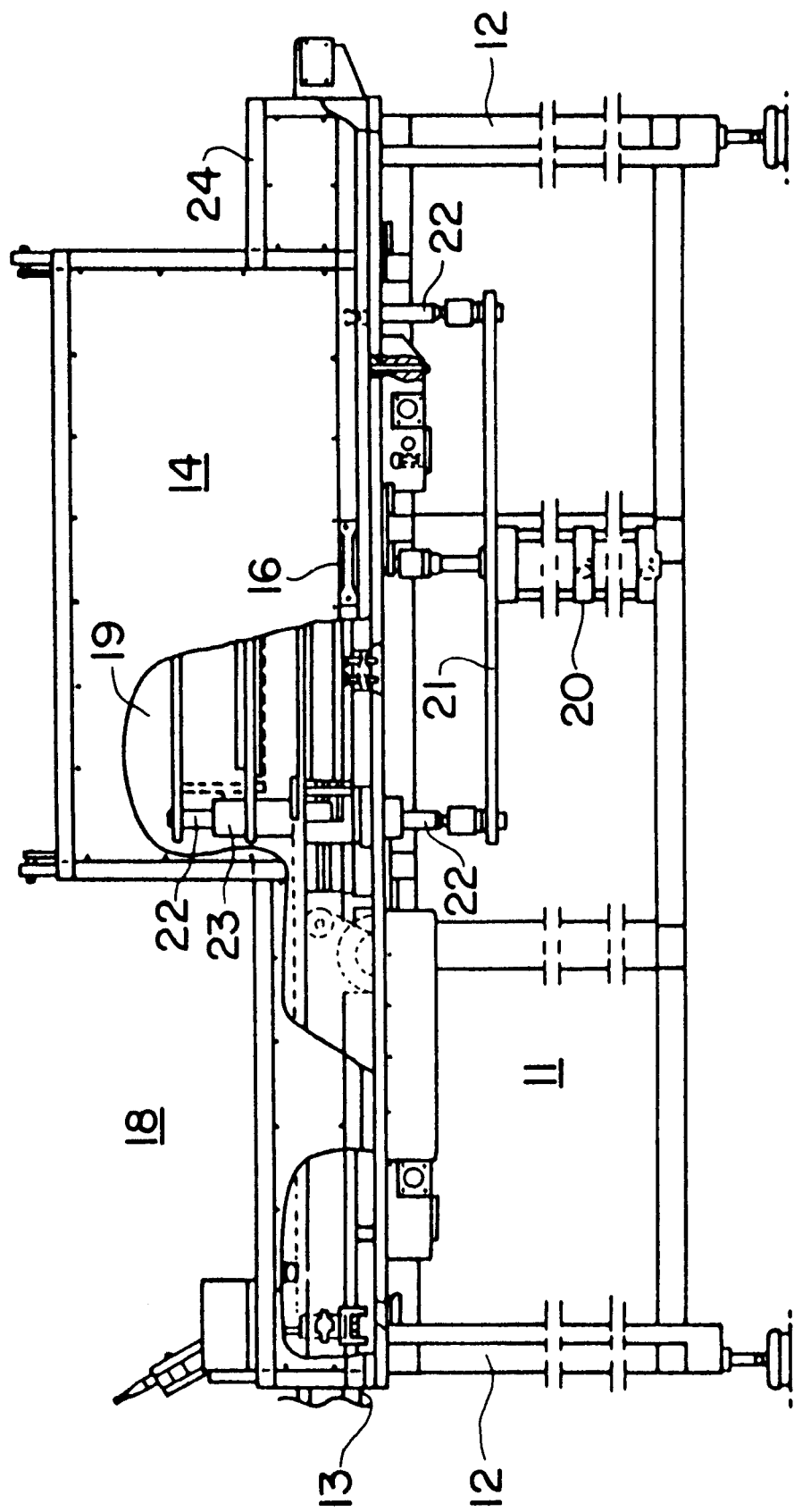
FIG. 1 is a partially cut away elevation view of one of the embodiments for precuring a polymerizable monomer or monomer mixture to form a soft contact lens.

The present invention is useful in a process for forming soft contact lenses from a polymerizable monomer or monomer mixture. The soft contact lenses are formed in a mold assembly having a first concave and a second convex mold half. As illustrate in FIG. 4a1, the mold halves are formed of polystyrene transparent to visible and ultraviolet light, with a central curved section defining a concave surface 31, a convex surface 33 and circular circumferential edge 31(c), and integral with said edge an annular essentially uniplanar flange 31(a). At least a part of the concave surface 31 and the convex surface 33 have the dimensions of the front or back curves, respectively of a contact lens to be produced in the mold assembly, and are smooth so that the surface of the contact lens formed by polymerization of said polymerizable composition in contact with the surface is optically acceptable. The mold is thin enough to transmit heat therethrough rapidly and has rigidity sufficient to withstand prying forces applied to separate the mold halves during demolding step which occurs after the cure step in the manufacturing process.

The present invention is directed to an additional precure step introduced between the assembly of the mold with a polymerizable monomer or monomer mixture, and the cure step. The precure step partially cures the polymerizable monomer or monomer mixture to a viscous gel and initiates polymerization throughout the mixture. During this precure step the parallel alignment of the mold halves are "frozen" by the viscous gel like nature of the partially polymerized monomer gel which prevents decentration and enables unattended and unweighted cure during the remainder of the cure period. The addition of this precure step has substantially reduced the number of defective lenses resulting from traditional methods of manufacture.

The complimentary pair of first 31 and second 33 mold halves which define the shape of the final desired lens are used to direct mold the monomer mixture wherein the mixture is dissolved in a nonaqueous water displacable solvent. After the filling or dosing step, in which the front concave mold half 31 is substantially filled with a polymerization mixture 32, the concave front mold half 31 is covered with a base mold half 33 under a vacuum to ensure that no air bubbles are trapped between the mold halves. The base mold half is then brought to rest on the circumferential edge 31(c) of the concave front mold half to ensure that the resultant lenses are properly aligned and without distortion.

The first and second mold halves are then clamped together. This clamping step may be done following assembly of the mold halves, during precure, or both. The clamping step displaces any surplus monomer from the mold area and properly aligns the mold halves by alignment of the mold flanges. When the clamping step occurs in the precure process, the mold halves are clamped under pressure, the monomer or monomer mixture is then exposed to actinic light, preferably from a UV lamp, while the mold halves are clamped. Typically the mold halves are clamped for approximately 40 seconds with 30 seconds of actinic radiation. At the completion of the precure step, the monomer or monomer mixture has formed a partially polymerized gel, with polymerization initiated throughout the mixture.

Following the novel precure step, the monomer/diluent mixture is then cured in a UV oven whereby polymerization of the monomer(s) is completed. This irradiation with actinic, visible or ultraviolet radiation produces a polymer/diluent mixture in the shape of the final desired hydrogel lens. After the polymerization process is completed, the two halves of the mold are separated in a demolding step typically leaving the contact lens in the first or front curve mold half, from which it is subsequently removed. The front and base curve mold halves are used for a single molding and then discarded or disposed of. After the demolding step, the solvent is displaced with water to produce a hydrated lens, which when fully hydrated and buffered, will be of the final shape and size which, in most cases, is nominally 10% larger than the original molded polymer/diluent article.

The present invention is therefore a novel precure step, and includes two separate embodiments of an apparatus for performing the same. The precure step is inserted in the process immediately after the polymerizable composition is placed in the front curve mold half, and the mold halves assembled.

The compositions to which this precure step may be directed include copolymers based on 2-hydroxyethyl methacrylate ("HEMA") and one or more comonomers such as 2-hydroxyethyl acrylate, methyl acrylate, methyl methacrylate, vinyl pyrrolidone, N-vinyl acrylamide, hydroxypropyl methacrylate, isobutyl methacrylate, styrene, ethoxyethyl methacrylate, methoxy triethyleneglycol methacylate, glycidyl methacrylate, diacetone acrylamide, vinyl acetate, acrylamide, hydroxytrimethylene acrylate, methoxyethyl methacrylate, acrylic acid, methacryl acid, glyceryl methacrylate, and dimethylamino ethyl acrylate.

Preferred polymerizable compositions are disclosed in U.S. Pat. No. 4,495,313 to Larsen, U.S. Pat. No. 5,039,459 to Larsen et al. and U.S. Pat. No. 4,680,336 to Larsen et al., the disclosures of which are hereby incorporated herein by reference. Such compositions comprise anhydrous mixtures of a polymerizable hydrophilic hydroxy ester of acrylic acid or methacrylic acid and a polyhydric alcohol, and a water displaceable ester of boric acid and a polyhydroxyl compound having preferably at least 3 hydroxyl groups. Polymerization of such compositions, followed by displacement of the boric acid ester with water, yields a hydrophilic contact lens. The mold assembly of the present invention described herein may be used to make hydrophobic or rigid contact lenses, but the manufacture of hydrophilic lenses is preferred.

The polymerizable compositions preferably contain a small amount of a cross-linking agent, usually from 0.05 to 2% and most frequently from 0.05 to 1.0%, of a diester or triester. Examples of representative cross linking agents include: ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylglycol dimethacrylate, dipropylene glycol dimethacrylate, diethylene glycol diacrylate, dipropylene glycol diacrylate, glycerine trimethacrylate, trimethylol propane triacrylate, trimethylol propane trimethacrylate, and the like. Typical cross-linking agents usually, but not necessarily, have at least two ethylenically unsaturated double bonds.

The polymerizable compositions generally also include a catalyst, usually from about 0.05 to 1% of a free radical catalyst. Typical examples of such catalysts include lauroyl peroxide, benzoyl peroxide, isopropyl percarbonate, azobisisobutyronitrile and known redox systems such as the ammonium persulfate-sodium metabisulfite combination and the like. Irradiation by ultraviolet light, electron beam or a radioactive source may also be employed to catalyze the polymerization reaction, optionally with the addition of a polymerization initiator. Representative initiators include camphorquinone, ethyl-4-(N,N-dimethylamino)benzoate, and 4-(2-hydroxyethoxy)phenyl-2-hydroxyl-2-propyl ketone.

Polymerization of the polymerizable composition in the mold assembly is preferably carried out by exposing the composition to polymerization initiating conditions. The preferred technique is to include in the composition initiators which work upon expose to ultraviolet or visible radiation; and exposing the composition to ultraviolet or visible radiation of an intensity and duration effective to initiate polymerization and to allow it to proceed. For this reason, the mold halves are preferably transparent to ultraviolet or visible radiation. After the precure step, the monomer is again exposed to ultraviolet or visible radiation in a cure step in which the polymerization is permitted to proceed to completion. The required duration of the remainder of the reaction can readily be ascertained experimentally for any polymerizable composition.

After the polymerizable composition has polymerized, the mold assembly is disassembled to permit further processing of the polymerized hydrogel into a contact lens (such processing including e.g. washing and hydrating, and packaging of the lens). Preferably, the flanges of the front and back curve mold halves are gripped and pulled away from each other, either in directly opposite directions or through an angle in a prying sort of motion. Advantageously, the back curve is first heated moderately to facilitate separation of the polymerized article from the back curve mold half surfaces.

THE PRECURE APPARATUS

Figure 2:
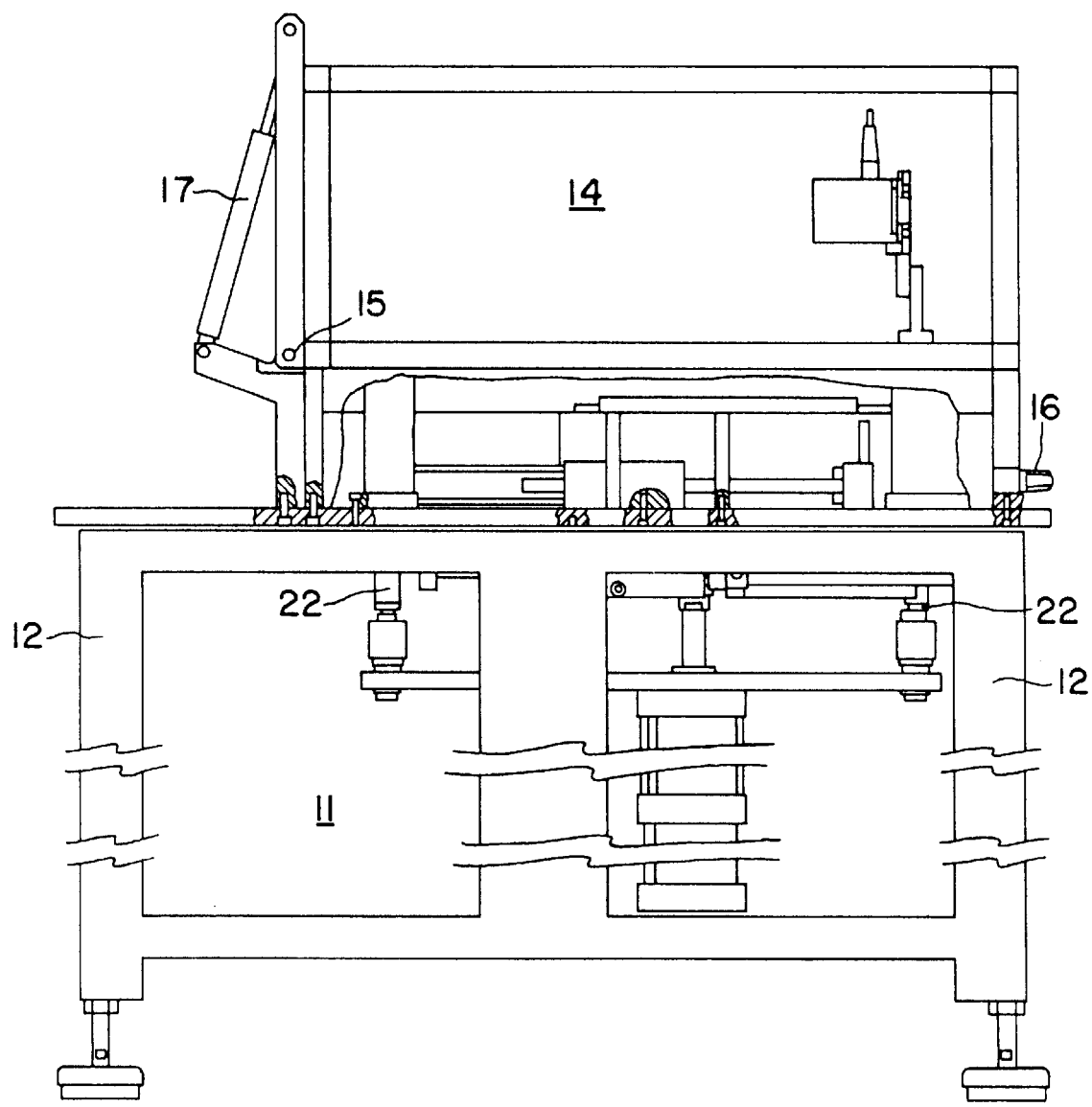
FIG. 2 is an end elevation view of the apparatus illustrated in FIG. 1.
Figure 3:
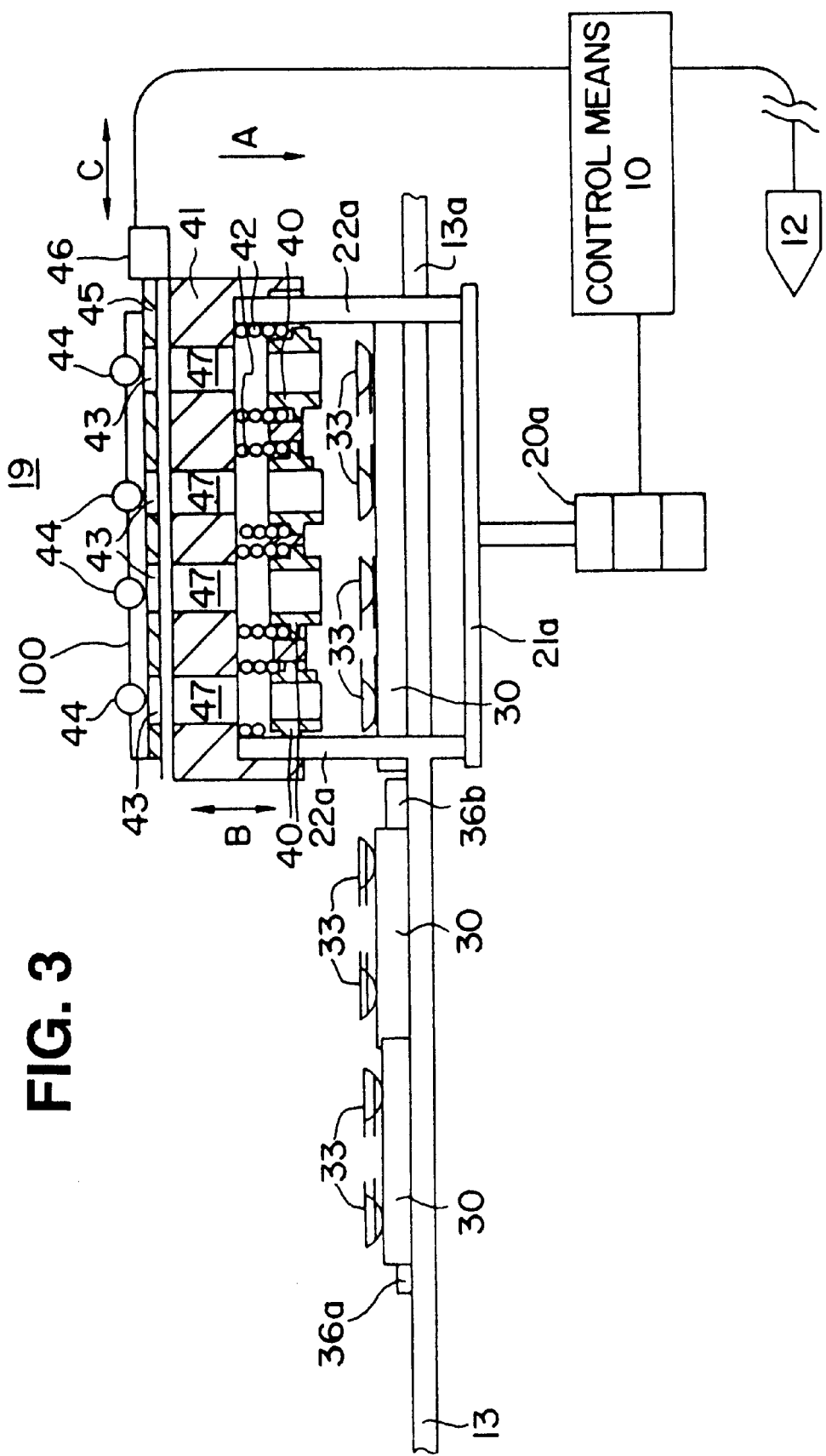
FIG. 3 is a diagrammatic and schematic illustration of one embodiment of the invention.

FIG. 1 and FIG. 2 represent a side elevation view and an end elevation view, respectively, of an apparatus for practicing the present invention. As illustrated in FIGS. 1 and 2, a support frame 11 having legs 12 provides support for the device at an elevation of an infeed conveyor 33. As shown in FIG. 3, the precure apparatus receives a plurality of pallets, one of which is illustrated in FIG. 4, having a plurality of contact lens molds therein, from the infeed conveyor 13. As seen in FIG. 3, the infeed conveyor 13 delivers the pallets 30 and molds 31, 33 to a low oxygen environment, which environment is accomplished by pressurizing an enclosure 14 with nitrogen gas. Prior to polymerization, the monomer is susceptible to absorption of oxygen which results in degradation of the resultant lens. The enclosure 14 may be pivoted about pivot point 15 by lifting on handle member 16. A gas strut assist device 17 will hold the enclosure 14 in an open position for servicing of the apparatus.

As illustrated in FIG. 3, the conveyor 13 delivers pallets 30 containing a plurality of molds 31, 33 to an accumulating section generally indicated 18 which gathers a plurality of pallets for the precure step. In the embodiment illustrated in FIGS. 1–2 and 6–8, twelve pallets of the type illustrated in FIG. 4 are accumulated for a total of 96 molds in each batch operation. In the embodiment illustrated in FIGS. 9 and 10 a total of 12 pallets having 96 contact lens molds thereon are batched for each precure operation. Accumulator 18 thus enables the precure apparatus of the present invention to batch process a plurality of molds for an extended period of time of 30 to 60 seconds while continuously receiving new pallets from the production line at the rate of 1 every 6 to 12 seconds.

Figure 7:
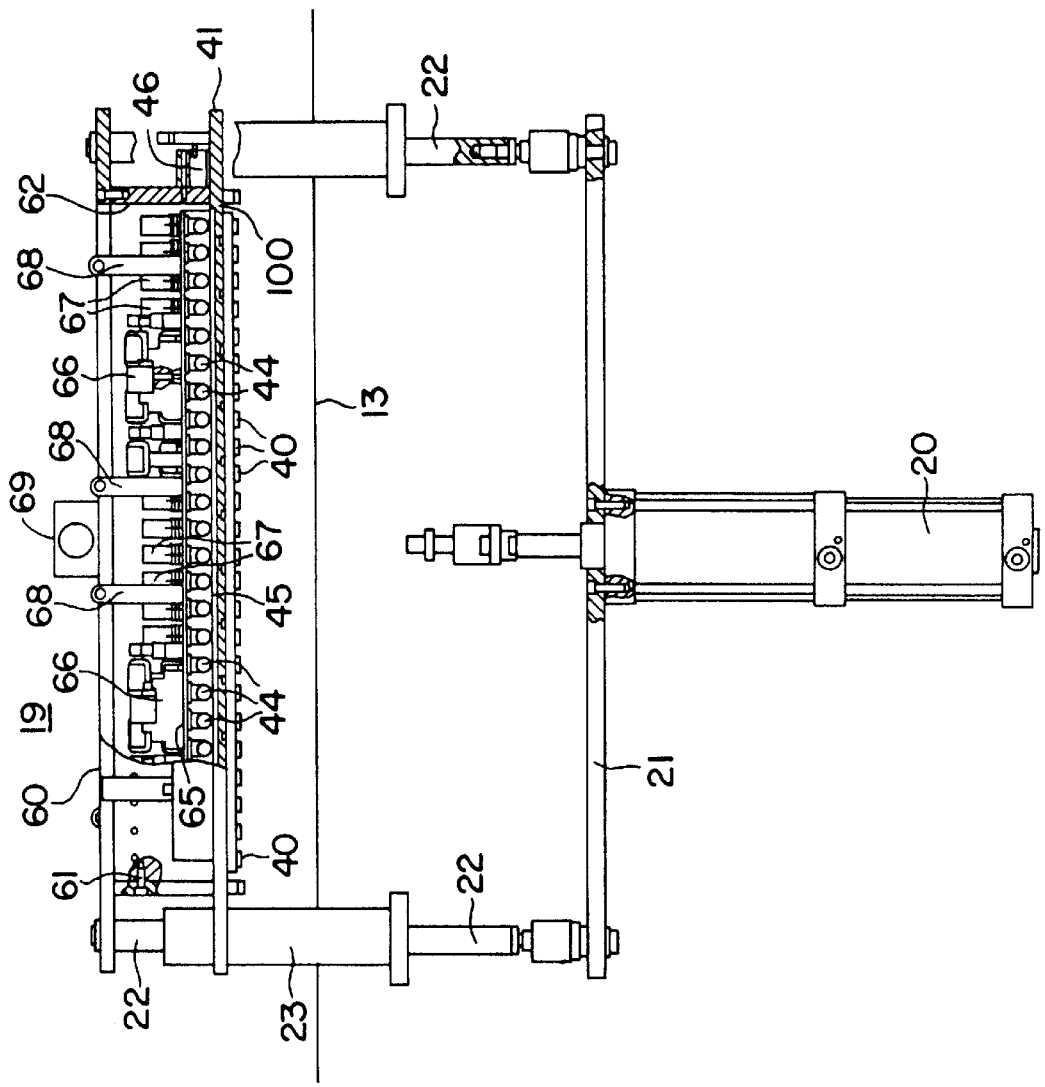
FIG. 7 is an elevational view of the apparatus illustrated in FIG. 6.
Figure 8:
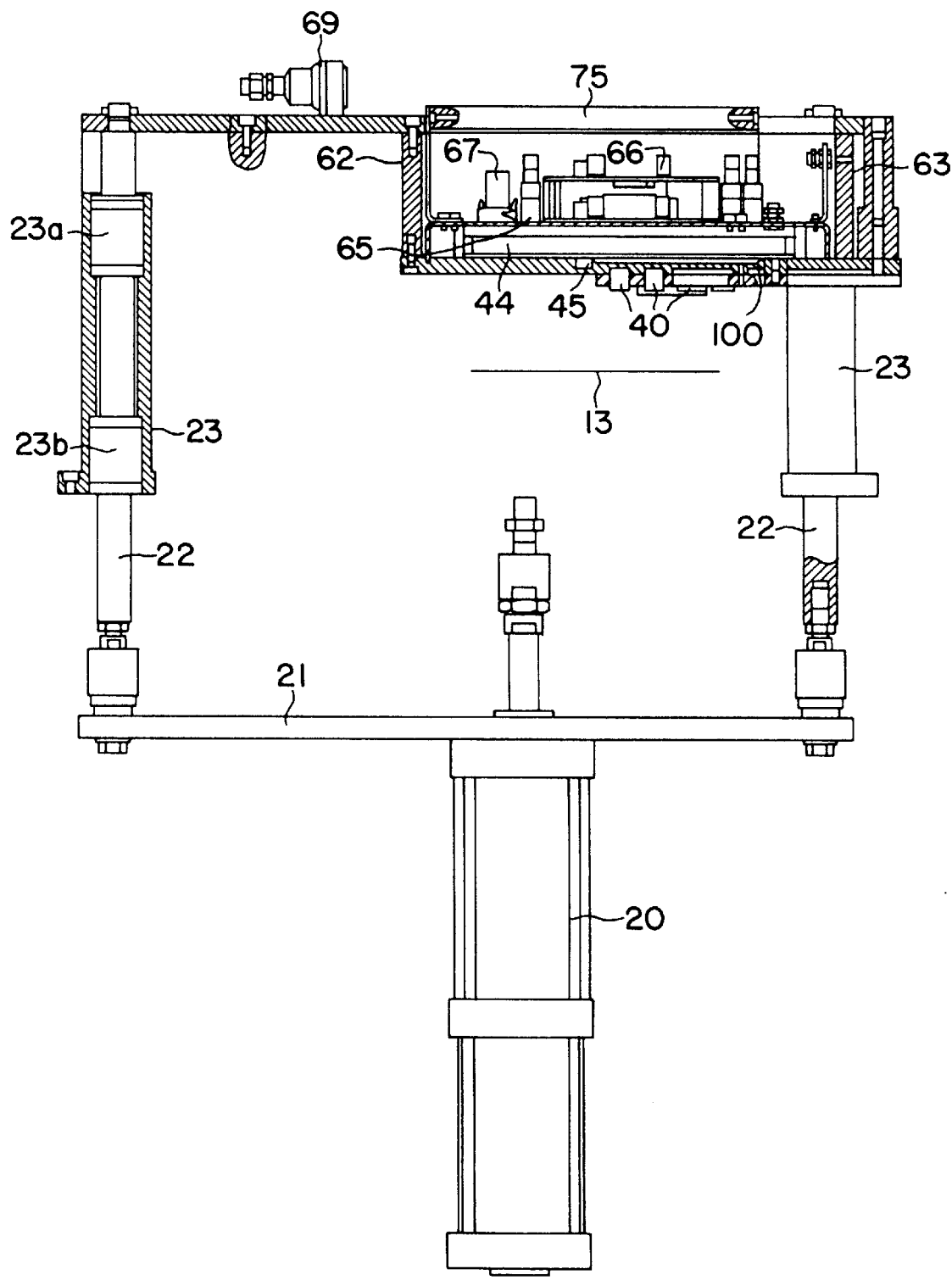
FIG. 8 is an end elevational view of the apparatus illustrated in FIG. 6.

The precure assembly 19 is partially visible in the breakaway portion of FIG. 1, and is further described with respect to FIGS. 6–8. It is raised and lowered into engagement with pallets containing contact lens molds by virtue of a pneumatic cylinder 20 which raises and lowers an intermediate support beam 21 and reciprocating shaft members 22 which are journaled for reciprocating support in member 23 as will be hereinafter subsequently described in greater detail. After the precure operation, the pallets with contact lens molds therein are discharged through a nitrogen ventilation airlock mechanism 24 (illustrated in FIG. 1) for subsequent cure by heat and cycled actinic radiation.

Figure 4A:
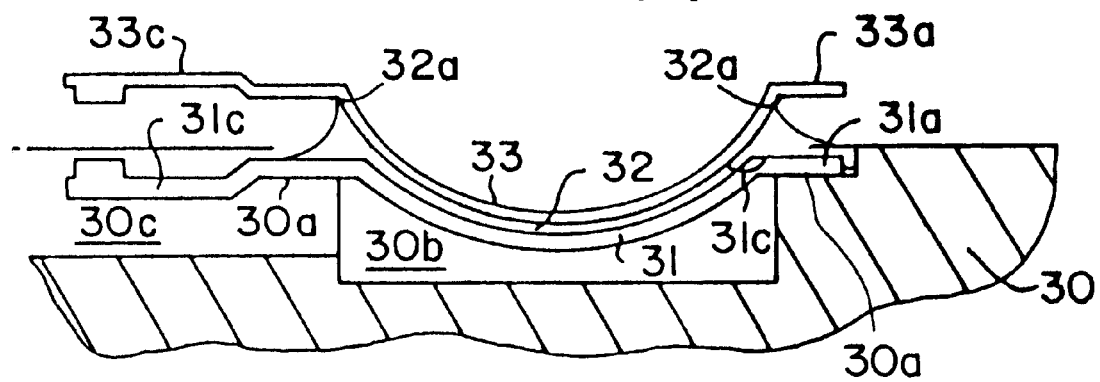
FIG. 4(a) is a diagrammatic and cross-sectional view of a pair of mold halves in the pallet carrier of FIG. 4.
Figure 4:
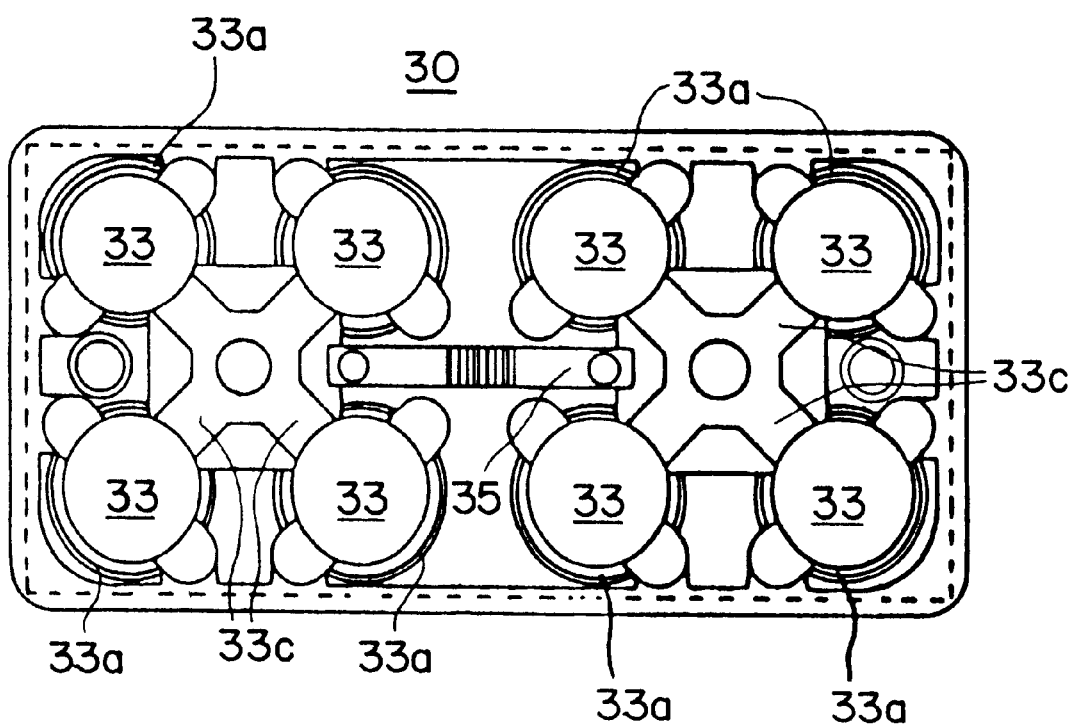
FIG. 4 is a plan view of a carrier used to transport a plurality of contact lens molds having a polymerizable monomer or monomer mixture therebetween to and from the precure station.

The present invention is particularly adapted to cooperate with a plurality of pallets as illustrated in FIGS. 4 and 4a which have a plurality of cavities for receiving a plurality of contact lens molds. As illustrated in FIG. 4a, the contact lenses of the present invention are formed by placing an amount of polymerizable composition, generally on the order of about 60 $\mu$l, in the first or concave mold half 31. The desired amount depends on the dimensions (i.e., the diameter and thickness) of the desired lens, taking into account the generation of by-products upon polymerization and exchange water for those by-products and diluent, if any, following polymerization.

Then a second or convex mold half 33 is placed onto the polymerizable composition 32 with the first and second mold halves aligned so that their axes of rotation are collinear and the respective flanges 31(a), 33(a) are parallel. The mold halves 31 are carried in an annular recess 30(a) which receives and supports the annular flange 31(a) of the first or concave mold half. The pallet 30 also has a plurality of recesses 30(b) for receiving the concave portion of the mold. The pallet also carries a plurality of oriented recesses 30(c) which receive a triangular tab portion 31(c) of the base mold half to provide a predefined angular position. The second or convex mold half 33 also includes a triangular tab 33(c) which overlies tab 31(c) to provide a collinear axis of rotation with respect to the two mold halves. The pallet 30 illustrated in FIG. 4 also contains a unique bar code number 35 for use in pallet tracking and quality control procedures.

FIG. 3 is a diagrammatic representation of a portion of the apparatus more fully illustrated in FIGS. 6–9 and FIGS. 9–10 which is particularly suited to an overview of the present invention. As illustrated in FIG. 3, the apparatus includes a conveyor system 13 for transporting a plurality of pallets 30 into and away from the precure station. Batch mode forks 36(a), 36(b) are used to gather and move a plurality of pallets into the precure apparatus.

The apparatus 19 includes multiple vertical reciprocal movements, a first one of which is in response to movement from air cylinders 20(a) and reciprocating beam 21(a). As the precure apparatus 19 is lowered in the direction illustrated by arrow A, a plurality of annular clamping means 41 will engage the upper annular flange 33(a) of each of the mold halves contained within pallets 30. A plurality of annular clamping means 40 are mounted on and travel with a reciprocating platform 41 of the apparatus, and are resiliently mounted therein for a second reciprocal movement along the direction of arrow B illustrated in FIG. 3.

Figure 5A:
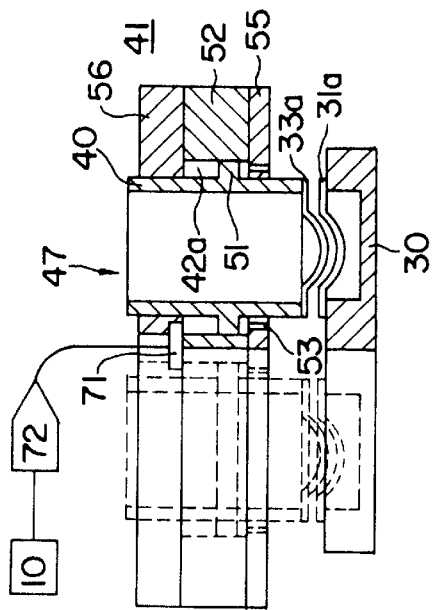
FIG. 5(a) is a diagrammatic illustration of one embodiment of the present invention which uses an air driven clamp for clamping the mold halves together.
Figure 5B:
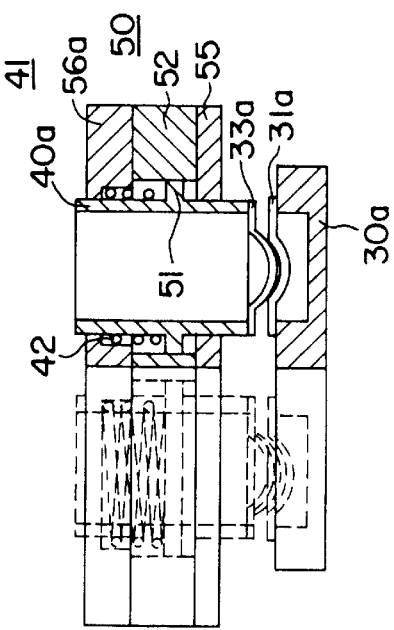
FIG. 5(b) is a diagrammatic illustration of a second embodiment of the present invention which uses a spring driven clamp for clamping the mold halves together.

As illustrated in FIGS. 3 and 5(a)–(d), the clamping means 40 are biased within frame 41 by springs 42 (illustrated diagrammatically) which may be the air spring 42(a) illustrated in FIG. 5a or a helical spring 42 as illustrated in FIG. 5b. As the apparatus is lowered, the clamping means will engage and clamp the first and second mold halves together with the force determined by the spring means 42. When air springs are used, the force will be determined by the amount of pressure provided to the air cylinder 42(a). While clamping means 40 have been illustrated as four members in FIG. 3 for illustrative purposes, it is understood that in the embodiments illustrated in FIGS. 6–8 and the embodiment illustrated in FIGS. 9–10 that there are 96 individual clamping means, with an individual clamping means for each of the mold halves.

Positioned above the clamping apparatus are a plurality of actinic light sources 44 which may be UV lamps. The lamps are separated from the clamping area by Pyrex glass 100 which separates the precure apparatus into two separate heat zones. This enables cooling of the actinic lamps 44, while maintaining the clamping zone at an optimal cure temperature. The glass 100 also protects the lamps from monomer emissions which collect on the glass 100 rather than the lamps 44. After the clamping means has engaged the mold halves to clamp them together, a shutter mechanism 45 is opened by air cylinder 46 to enable the actinic light source 44 to initiate polymerization of the polymerizable composition in each of the mold halves 33. Shutter 45 has a plurality of openings 43 defined therein and is reciprocal along the x axis as indicated by arrow C in FIG. 3 in order to open and close the exposure passage ways 47.

The operation of the precure apparatus 19 is set by control circuit 10 which controls the duration of the clamping period by the length of time air cylinder 20(a) is activated to its reciprocal down position. Control circuit 10 also controls the amount of radiation received by the molds controlling the duration of the exposure period through operation of shutter 45 and air cylinder 46. The intensity may also be manually adjusted by raising or lowering the lamps 44 with respect to molds 31, 33. Optionally, the polymerization radiation may be generated remotely and routed to the clamped mold halves and polymerizable material via a fiber optic system, with control system 10 providing control of exposure time and energy level.

The amount of force applied by clamping means 40 may be varied from approximately 0.5 Kgf to 2.0 Kgf/per lens and is applied to keep the flange 33(a) of the second convex mold half parallel to the flange 31(a) of the first concave mold half for the duration of the exposure. The clamping weight is applied for 10 to 60 seconds, but typically for a period of 40 seconds by control means 10. After approximately 0–20 seconds of weight, preferably 10 seconds, actinic radiation from UV lamps 44 is applied to the assembled mold and the polymerizable monomer. Typically, the intensity of the UV light source is 2–4 mW/cm$^2$, and this intensity of light is applied for 10 to 50 seconds, but in the preferred embodiment, is applied for 30 seconds.

In the preferred embodiment, the UV lamp source are tubular low pressure mercury vapor fluorescent lamps which emit a long wave ultraviolet radiation having a highly concentrated radiation between 320 and 390 nm. In one embodiment, by way of example, the lamps are manufactured by Philips as model 'TL' 29 D 16/09 N having a nominal wattage of 14 watts and an average radiation of 1.8 watts in the desired spectrum.

The mold halves are first clamped together for a predetermined period of time, prior to exposure, in order to allow equilibrium to develop between the monomer and the mold cavity, and to allow any excess monomer to be extruded out of the mold cavity into the space between flanges 31(*a*) and 32(*a*) where it forms a ring of excess monomer 33(*a*), which is generally referred to as a "HEMA" ring when hydroxyethylmethacrylate monomer is used. The first or concave mold cavity includes a sharp annular edge 31(*c*) to cleanly contact the convex portion of mold half 33 and thereby separate the contact lens 32 from the HEMA ring 32(*a*). The pre-exposure clamping period allows for any excess monomer to migrate from the mold cavity to the HEMA ring, enables the second mold cavity to seat cleanly on parting edge 31(*c*), and allows an equilibrium to develop between the mold halves and the monomer.

Although the mold halves may be held together until the monomer(s) are completely cured, in the preferred embodiment actinic radiation on the order of 2–4 mW/cm$^2$ is applied for approximately 30 seconds. Different intensities and exposure times could be used, including pulsed and cycled high intensity UV on the order of 10 to 150 mW/cm$^2$ with exposure times running from 5 to 60 seconds. In a pulsed or cycled exposure, the actinic radiation may be cycled on for 3 to 10 seconds and then off for 3 to 10 seconds with a total of 1 to 10 cycles of radiation. At the end of the radiation period, the shutter 45 is closed by reciprocating it to the right as illustrated in FIG. 3 and the weight is removed by energizing cylinder 20(*a*) to lift the precure assembly 19 upwardly by means of push rods 22(*a*). As the assembly 19 is lifted, the clamping means 40 will be lifted clear of the molds and pallets to enable them to be transported out of the precure means by means of conveyor 13(*a*). During the precure time, the temperature in the system may be varied from ambient to 50° C.

At the conclusion of the precure process, the monomer has gone through initiation and some degree of polymerization. The resultant product is in a gel state with some areas of the product that have the least thickness, i.e., the edge, having a higher degree of polymerization than the body. As the monomer polymerizes it forms a seal along the parting edge 31(*c*), which together with the inherent shrinkage of the monomer from polymerization, forms a secure mold package that may be cured in atmospheric conditions.

The clamping pressure aligns the mold flanges to provide substantially parallel alignment of the flanges, and the seal maintains them in a parallel position which results in improved optical characteristics near the theoretical maximum of the plastic mold halves. Further, the clamping, and resultant seal from the partial cure results in highly repeatable values for centration and an improved "clean" edge at the circumference of the lens.

FIGS. 5*a* and 5*b* are schematic illustrations of two alternate means for clamping the mold halves together. In FIG. 5*a* an air spring is used to displace the clamping means 40 downwardly with respect to the movement of reciprocating platform 41. In the embodiment illustrated in FIG. 5*b*, a resilient coil spring 42 is used to drive the clamping means 40 downwardly with respect to the movement of reciprocating platform 41. The clamping means 40 illustrated in FIGS. 5(*c*) and 5(*d*) is particularly adapted for use with the embodiment illustrated in FIG. 5(*b*), but with minor modifications could be used in the embodiment of FIG. 5(*a*).

As illustrated in FIG. 5*a*, reciprocating platform 41 includes a plurality of annular cylinders 40, each of which has an annular flange 51 formed thereon, which reciprocates within a cylinder defined by spacer plate 52 to form an air spring or air cylinder 42(*a*). The cylinder is vented to atmosphere by vents, one of which is illustrated at 53 in FIG. 5*a* to enable air pressure in the air cylinder 42(*a*) to drive the flange 51 and clamping means 40 downwardly against a stop plate 55 when the air cylinder 42(*a*) is pressurized. The carriage 50 also includes an upper stop member 56 which defines the upper limit of travel by annular flange 51, and serves as reciprocal bearing support for the clamping means 40. The upper stop member 56 also defines a plurality of air plenums, one of which is schematically illustrated at 71, which provide air pressure for the air cylinder 42(*a*).

Air pressure is supplied to plenum 71 by solenoid air valve 72 which is activated by control means 10. As indicated previously, the air pressure supplied to air cylinder 42(*a*) is variable to generate a clamping force of 0.5 Kgf to 2.0 Kgf on the annular flange 33(*a*). As the reciprocating platform 41 is lowered over the pallet 30 and the contact lens molds, the annular clamping means 40 and the plurality of engagement members formed thereon engage the annular flange 33(*a*) formed on the second or convex mold half to urge it downwardly and clamp it into engagement with mold half 31. The movement of reciprocating platform 41 is defined by the movement of the entire assembly 19 as driven by air cylinder 20.

Figure 5C:
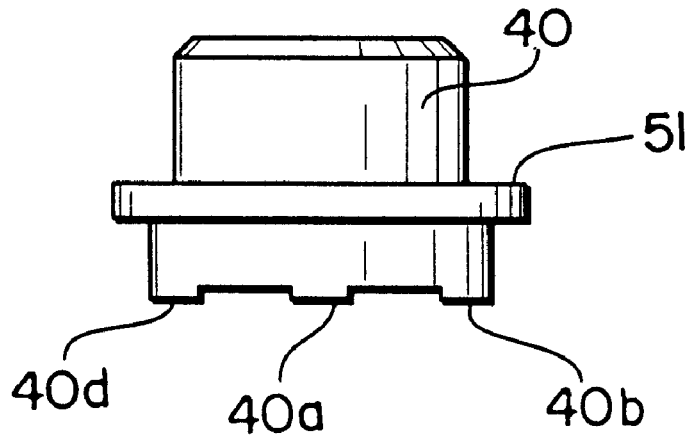
FIG. 5(c) is an elevation view of one of the clamping members used in the second embodiment illustrated in FIG. 5(b) which illustrates one clamp construction that minimizes surface energy attraction.
Figure 5D:
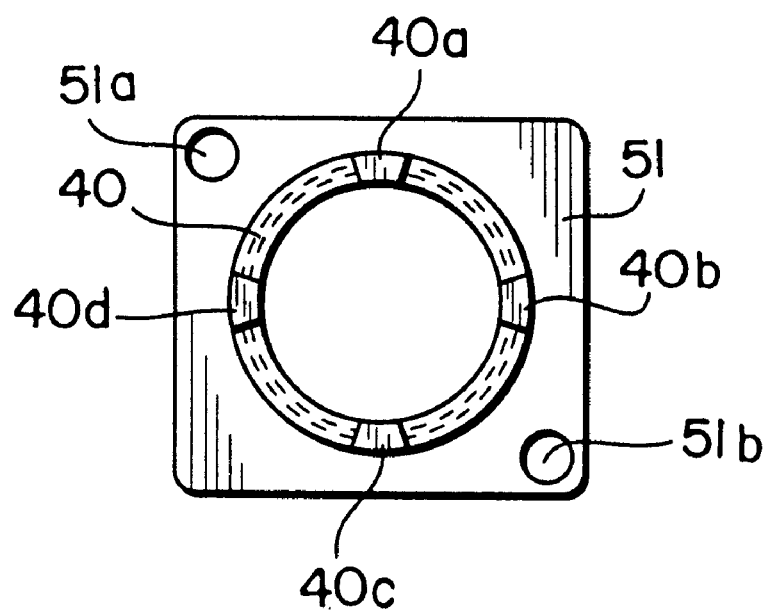
FIG. 5(d) is a top elevation view of the clamping member illustrated in FIG. 5(c).

As illustrated in FIGS. 5*b–d*, the annular clamping cylinder 40 also includes a rectangular flange 51 which is engaged by a resilient coil spring 42 and driven downwardly, as illustrated in FIG. 5*b*, against stop plate 55. The other end of coil spring 42 is mounted within upper stop plate 56(*a*). Spacer plate 52 and the upper stop plate 56 provide support and guidance for the vertical reciprocation of clamping members 40.

The clamping member 40, as illustrated in FIGS. 5(*c*) and (*d*) is formed of stainless steel, and optionally the mass of the clamping members may be increased to enable the clamping members to clamp by weight alone, without air or spring assist. However, the combination of the individual reciprocal clamping means 40 and locally driven resilient biasing means enable precise control of the amount of clamping pressure exerted on the plastic flanges 33(*a*) of the upper mold regardless of the amount of force needed to move the mass of the entire precure assembly 19. Formed on the engaging annulus of clamping number 40 are a plurality of engagement members 40(*a*)–(*d*) which minimize the surface area of engagement between the clamping member and the mold halves. These engagement members are integrally formed from the annular cylinder as downwardly extending square tooth members, by cutting away portions of the annular member. In the embodiment illustrated in FIG. 5(*b*), 5(*c*) and 5(*d*), the flange member 51 is rectangular, with mounting holes 51(*a*), (*b*) which are used to mount the clamping member to coil spring member 42. When formed for use with the embodiment illustrated in FIG. 5(*a*), flange member 51 would be annular, and member 40 would be uniform in diameter through out its length.

The engagement members 40(*a*)–(*d*) are approximately 3.5 mm in thickness, and 4 mm in length, which has been found sufficient to ensure evenly distributed pressure around the knife edge 31(*c*) (FIG. 4(*a*)) while minimizing the area of engagement which might otherwise be susceptible to surface energy attraction or oil migration from the mold halves. While the preferred configuration for the engagement members is illustrated in FIG. 5(*c*), any configuration of engagement members 40(*a*)–(*d*) would work, provided the clamping pressure is distributed in a radially uniform manner about the circular knife edge 31(*c*). Non-uniform distribution of the clamping pressure may result in tipping of the upper or back curve mold half with respect to the lower or front curve mold half As noted earlier, while the incidence of attraction between the clamping member 40 and the clamped set of mold halves is very low, and a very small fraction of 1%, the cost in down time associated with changing atmospheres, cleaning the contaminated area, recharging the inert atmosphere and restarting the line is very high.

FIGS. 6–8 are top side and end elevation views of one embodiment of the apparatus for performing the present invention. As illustrated in FIGS. 6–8, the precure assembly 19 is mounted on reciprocating support shafts 22 which are journaled for reciprocating motion within support members 23 which are fixably mounted to a frame. Each of the support members 23 include upper and lower bearings or journals 23(*a*), 23(*b*) to provide for precision guidance of the reciprocating shafts 22. Shafts 22 are driven by intermediate support frame 21 which is in turn driven by air cylinder 20 as previously described.

The precure assembly 19 is reciprocated vertically with respect to the upper most surface of the conveyor 13 illustrated schematically in FIGS. 7 and 8. The precure assembly 19 is supported from an upper support frame 60 from which various operating components are suspended by intermediate support members at each corner generally illustrated at 61, 62 in FIG. 7 an 62, 63 in FIG. 8. These members suspend the reciprocating platform 41, into which the individual clamping means 40 are fitted for a secondary reciprocating along the same axis. A separate subframe 65 is mounted on platform 41 and provides support for the ultraviolet lamps 44 and the ballast members 66 which provide the high voltage for the UV lamps, and the starters 67 which are used to initiate fluorescence. In one embodiment, by way of example, the ballast members may be BTP 30C05S, as manufactured by Philips and the starters may be model S2, as manufactured by Philips. The intermediate support frame 65 may be lifted free from the reciprocating platform 41 by means of a plurality of handles 67 which are mounted via straps 68 to the intermediate support frame 65. Pyrex glass member 100 separates the lamps 44 from the clamping area to protect the lamps from monomer emissions, and to enable the lamps to be cooled, while keeping the precure zone at a temperature of ambient to 50° C. to facilitate polymerization. An oxygen detector 69 is also provided to monitor the low oxygen environment maintained within the protective cabinet 14 and an alarm is initiated if the oxygen content rises to an unacceptable level. Shutter 45 is positioned above the reciprocating platform 41 between the UV lamps 44 and the clamping means 40 and is reciprocated between its open and closed position by virtue of air cylinder 46.

The embodiment illustrated in FIGS. 6–8 utilizes the air cylinder or air springs depicted schematically in FIG. 5*a* with an internal common plenum formed in the reciprocating platform 41 by means of passageways in stop plate 56. Thus, each of the 96 clamping members 40 are reciprocated by their respective air cylinders, which are fed from common plenums, one of which is illustrated in FIG. 5*a* as plenum 71 formed in the upper stop plate 56.

Figure 9:
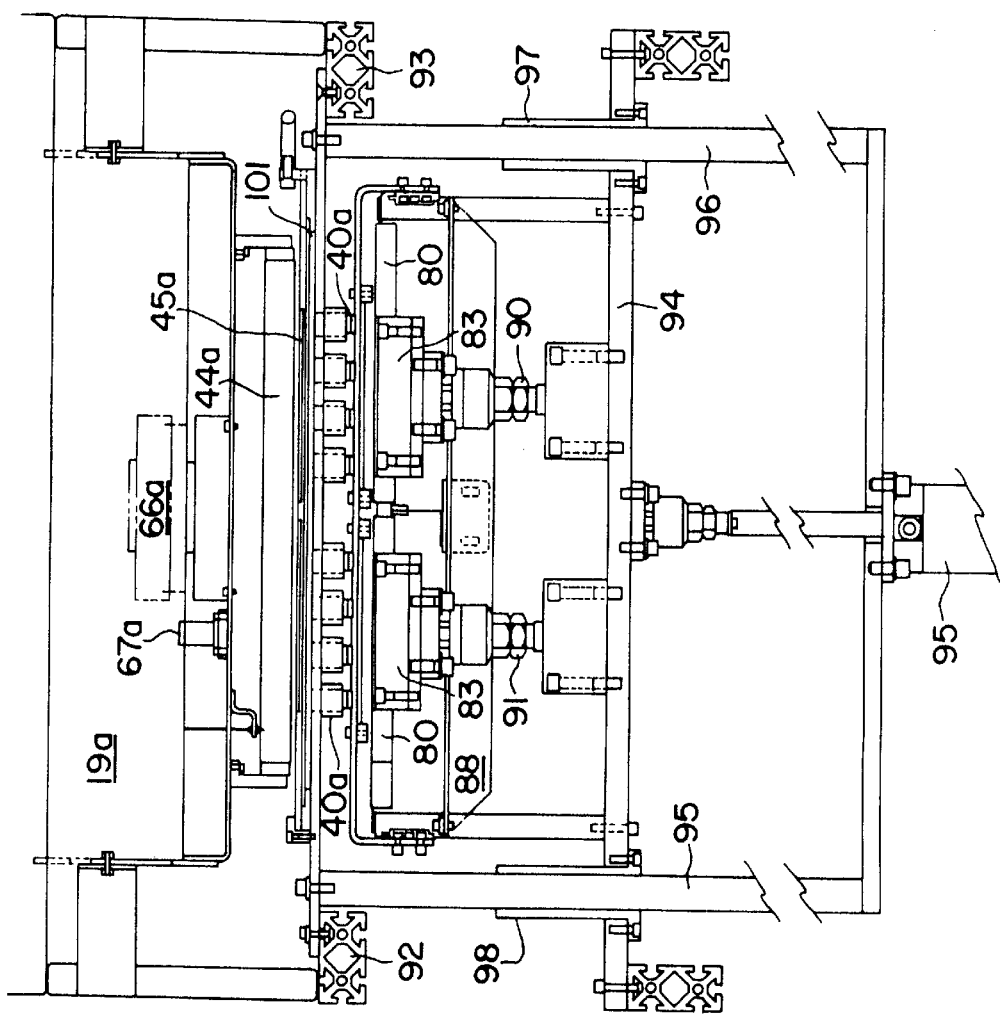
FIG. 9 is an elevational end view of a second embodiment of the present invention used to precure a polymerizable monomer or monomer mixture to form a soft contact lens.
Figure 10:
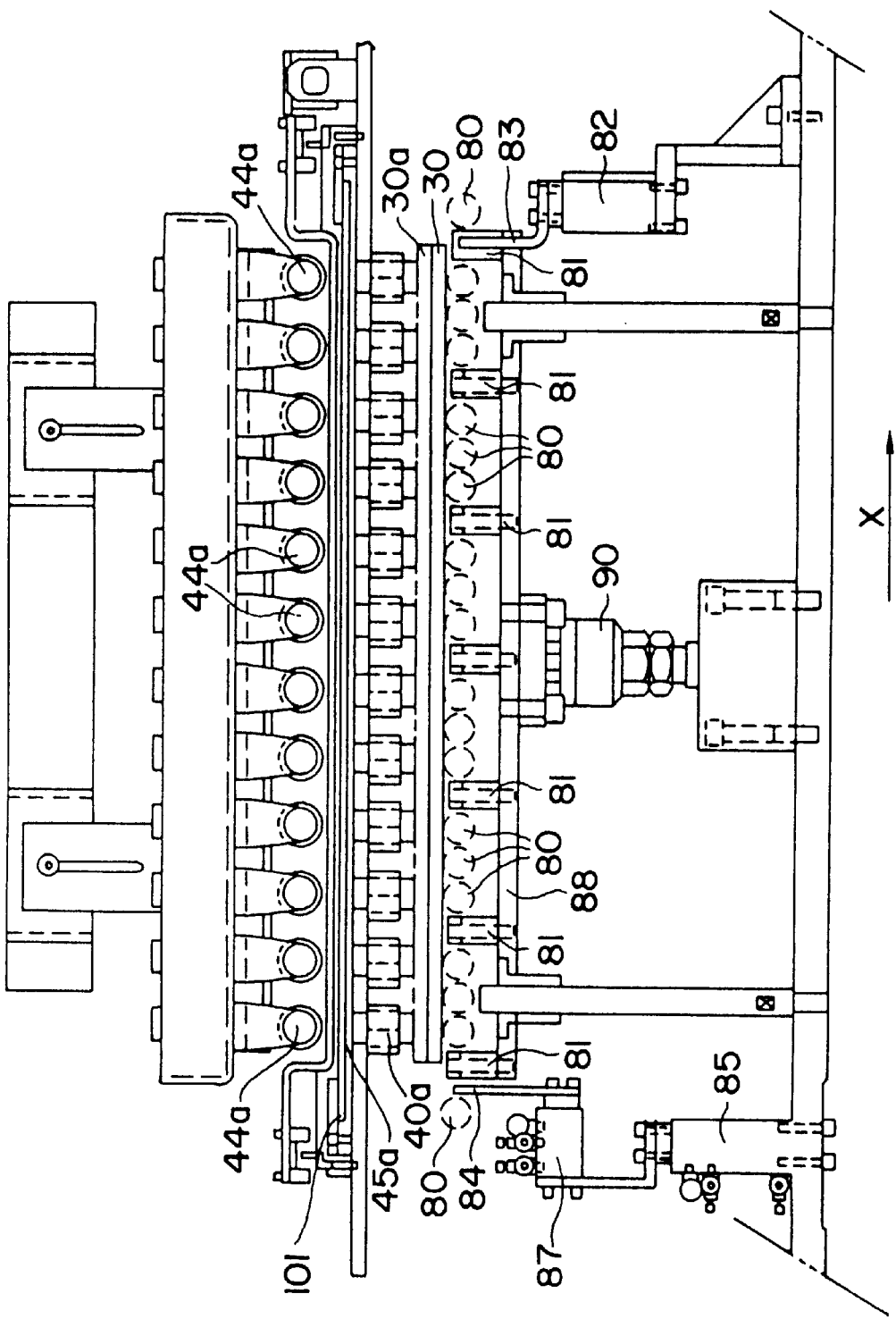
FIG. 10 is an elevational side view of the apparatus illustrated in FIG. 9.

FIGS. 9 and 10 depict a second preferred embodiment for practicing the present invention. As illustrated in FIGS. 6–8, the first preferred embodiment reciprocated the UV lamps and clamping members into and out of engagement with the mold halves and pallets carried by conveyor means 13. In the embodiment illustrated in FIGS. 9 and 10, the UV lamps are stationary, and the pallets are lifted from the conveyor into engagement with the clamping means for the precure period.

The clamping means utilized by the embodiment illustrated in FIGS. 9 and 10 utilizes the clamping means previously described with respect to FIG. 5*b*. In this embodiment, a plurality of clamping means 40(*a*) are mounted above a roller conveyor illustrated in side view of FIG. 10 by rollers 80. A plurality of lifting standards 81 are positioned between groups of rollers 80 on centers approximate the width of the pallets 30. In FIG. 10, a first row of pallets 30 is depicted resting on rollers 80 with adjoining edges of each of the pallets aligned along the top of the lifting standards 81.

The pallets 30 are aligned in position by means of stop means 83 which is lifted by air cylinder 82 during the loading of the precure apparatus. During loading of the device, the stop means 83 is reciprocated upwardly, and the requisite number of pallets 30 are advanced into the precure apparatus. When 6 pallets in each row have been advanced, a second stop means 84 is lifted by air cylinder 85 to define a limit on x axis travel as illustrated in FIG. 10. A separate air cylinder 87 is used in cooperation with stop means 83 to align the adjoining edges of the pallets 30 above the centers of the lifting standards 81. After the pallets have been aligned, the lifting standards 81 are reciprocated upwardly by means of intermediate support frame 88 and a pair of pneumatic motors 90 and 91.

The pallets are reciprocated upwardly to the position illustrated at 30(*a*) in FIG. 10, in which position they engage the clamping member 40(*a*) as previously described with respect to FIG. 5*b*. Each of the clamping members 40(*a*) also include a separate independent and resilient spring 42 for driving clamping member 40(*a*) and the upper mold half against the lower mold half during the precure period.

After the pallets and mold halves have been raised by air cylinders 90, 91, and the first and second mold halves clamped together by means of clamping means 40(*a*), a reciprocating shutter 45(*a*) is shifted as illustrated in FIG. 3 to align a plurality of openings therein with the central openings formed in the clamping means 40(*a*) and thereby enable exposure of the monomer in the mold halves by means of actinic light sources 44(*a*). The upper precure assembly 19(*a*) is fixably supported by means of support beams 92 and 93. High voltage ballast means 66(*a*) and starter 67(*a*) also initiate and maintain fluorescence within the UV light sources 44(*a*). The reciprocal subassembly of the embodiment illustrated in FIGS. 9 and 10 is mounted on an intermediate support frame 94 which may be raised and lowered by means of pneumatic cylinder 95 to provide for cleaning and servicing of the apparatus, and in particular, the clearing of the individual clamping means 40. Pyrex glass member 101 protects the lamps 44(*a*) from monomer emissions, and may be removed for clearing. Glass member 101 also divides the apparatus into two temperature zones, enabling cooling of lamps 44(*a*). The intermediate support frame 94 is guided and aligned with the exposure assembly 19 *a* by means of support rods 95, 96 and reciprocal bushing members 97, 98.

The clamping period and the amount of exposure to radiation are controlled by control means 10 in the manner previously described with respect to FIGS. 3 and 5.

Following the precure of the monomer in mold halves 31, 33 the pallets 30 are reciprocated downwardly to the position illustrated in FIG. 10 and advanced by conveyor rollers 80 to a subsequent conveyor (not shown) which transports the pallets to the final cure apparatus.

While the invention has been particularly shown and described with respect to the preferred embodiments thereof, it will be understood by those skilled in the art that the foregoing and other changes in form and details may be made therein without departing from the spirit and scope of the invention, which should be limited only by the scope of the appended claims.

What is claimed is:

1. A system for partially curing a polymerizable monomer or monomer mixture to form a soft contact lens, said system comprising:
    a polymerizable monomer or monomer mixture deposited in a contact lens mold having a first and a second half with said monomer therebetween;
    a plurality of engagement members that clamp said first mold half into engagement with said second mold half, said engagement members engage only one of said mold halves, each of said members engage said one of said mold halves with a predetermined pressure such that deformation of said one of said mold halves does not occur; and
    a radiation source that exposes said monomer to radiation to polymerize said monomer to a partially cured state.

2. The system for partially curing a polymerizable monomer or monomer mixture as claimed in claim 1 wherein said members clamp said first mold half into engagement with said second mold half while in a low oxygen environment.

3. The system for partially curing a polymerizable monomer or monomer mixture as claimed in claim 1 wherein said radiation source emits actinic, electron beam or radioactive energy.

4. The system for partially curing said polymerizable monomer or monomer mixture as claimed in claim 1 wherein said radiation source is an ultraviolet lamp.

5. The system for partially curing said polymerizable monomer or monomer mixture as claimed in claim 4 wherein said monomer is exposed to 2 to 150 mW/cm$^2$ of ultraviolet radiation at a wavelength of 320 to 390 nm.

6. The system for partially curing a polymerizable monomer or monomer mixture as claimed in claim 4 wherein said monomer is exposed to 2.4 mW/cm$^2$ of ultraviolet radiation at a wavelength of 350 nm.

7. The system for partially curing a polymerizable monomer or monomer mixture as claimed in claim 1, wherein said members engage said one of said mold halves at evenly distributed spaced locations.

8. A system for curing a polymerizable monomer or monomer mixture to form a contact lens, said system comprising:
    a polymerizable monomer or monomer mixture deposited in a contact lens mold having first and a second half with said monomer therebetween;
    a plurality of engagement members that clamp said first mold half into engagement with said second mold half, said engagement members engage only one of said mold halves, each of said members engage said one of said mold halves with a predetermined pressure such that deformation of said one of said mold halves does not occur; and
    a radiation source that exposes said monomer to radiation to polymerize said monomer.

9. The system for curing a polymerizable monomer or monomer mixture as claimed in claim 8, wherein said members engage said one of said mold halves at evenly distributed spaced locations.

10. A system for curing a polymerizable monomer or monomer mixture to form a contact lens, said system comprising:
    a polymerizable monomer or monomer mixture deposited in a contact lens mold having a first and a second half with said monomer therebetween , each of said mold halves having an annular flange;
    a plurality of engagement members that clamp said first mold half into engagement with said second mold half, each of said members engage said first mold half with a predetermined pressure, with said annular flanges of said mold halves substantially parallel;
    a first radiation source that exposes said monomer to radiation at a first location to polymerize said monomer to a partially cured state to seal said mold halves together, in alignment; and
    a second radiation source that exposes said monomer to radiation in a subsequent cure at a second location different from said first location to polymerize said monomer to a completely cured state;
    wherein said monomer is enclosed within said sealed mold halves during the exposure resulting in said partially cured state and said subsequent cure.

11. A system for curing a polymerizable monomer or monomer mixture to form a contact lens, said system comprising:
    a polymerizable monomer or monomer mixture deposited in a contact lens mold having a first and a second half with said monomer therebetween;
    a plurality of engagement members that clamp said first mold half into engagement with said second mold half, each of said members engage one of said mold halves with a predetermined pressure;
    a first radiation source that exposes said monomer to radiation at a first location to polymerize said monomer to a partially cured state; and
    a second radiation source that exposes said monomer to radiation at a second location different from said first location to polymerize said monomer to a completely cured state;
    wherein said monomer is enclosed within said mold halve during the exposure resulting in said partially cured state and the exposure resulting in said completely cured state.

12. The system for curing a polymerizable monomer or monomer mixture as claimed in claim 11, wherein a low oxygen environment is provided during the exposure resulting in said partially cured state, and wherein an atmospheric condition is provided during the exposure resulting in said completely cured state.

* * * * *

UNITED STATES PATENT AND TRADEMARK OFFICE
CERTIFICATE OF CORRECTION

PATENT NO. : 6,220,845 B1
DATED : April 24, 2001
INVENTOR(S) : Anthony Martin Wallace, Jonathan Patrick Adams, Kaj Bjerre, Ture Kinft-Larsen, Craig William Walker, Daniel Tsu-Fang Wang, Michael Francis Widman and Stephen Craig Pegram It is certified that error appears in the above-identified patent and that said Letters Patent is hereby corrected as shown below:

Column 13,
Line 44, "said" should be replaced with -- a --
Line 47, "said" should be replaced with -- a --

Signed and Sealed this

Twelfth Day of November, 2002

*Attest:*

*Attesting Officer*

JAMES E. ROGAN
*Director of the United States Patent and Trademark Office*